March 4, 1958     S. JACOVELLI ET AL     2,825,425
AUTOMATIC SLUDGE DRAINS FOR COMPRESSED AIR SYSTEMS
Filed Dec. 7, 1955     3 Sheets-Sheet 1
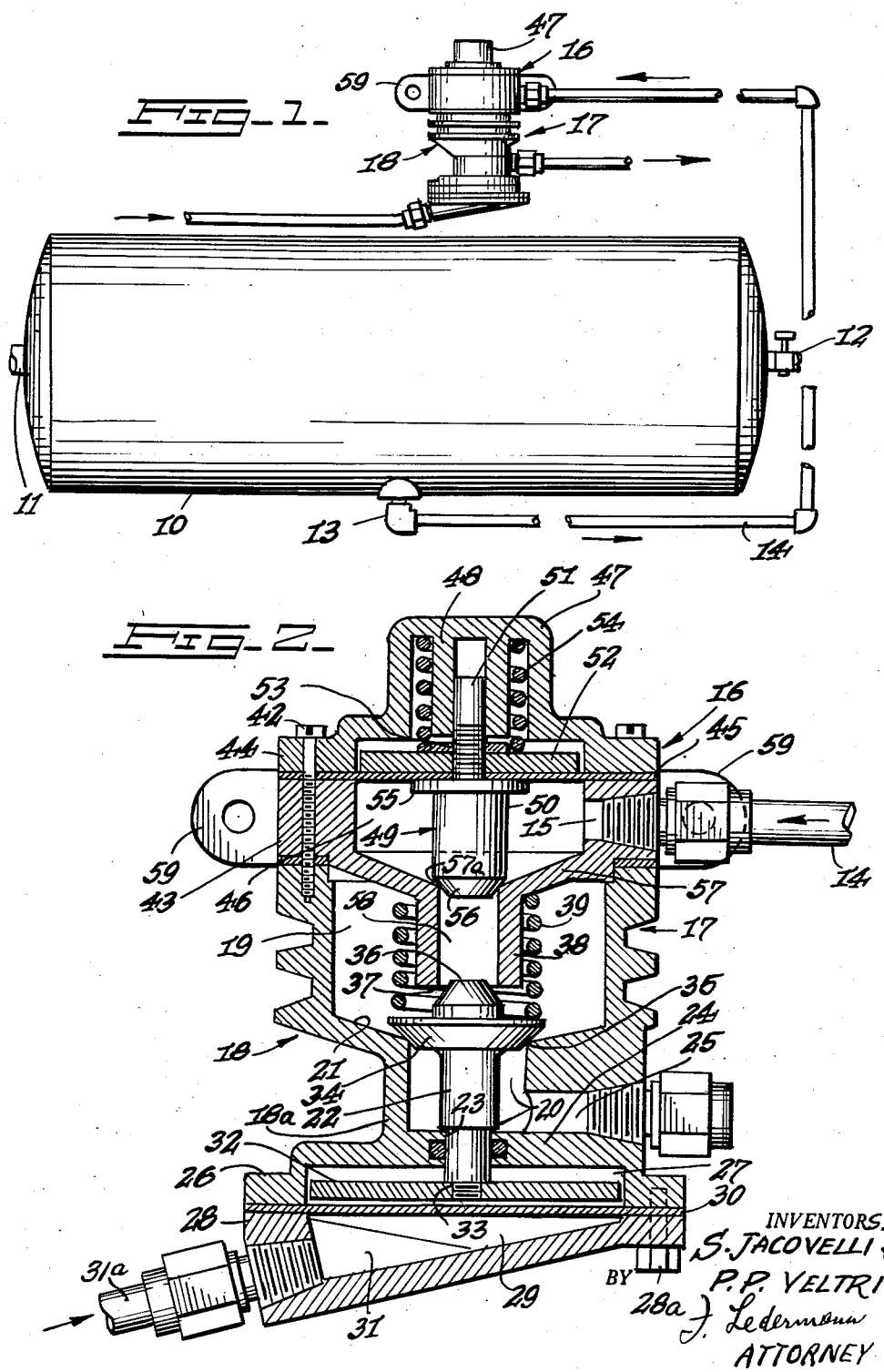
INVENTORS.
S. JACOVELLI +
P. P. VELTRI.
BY J. Ledermann
ATTORNEY

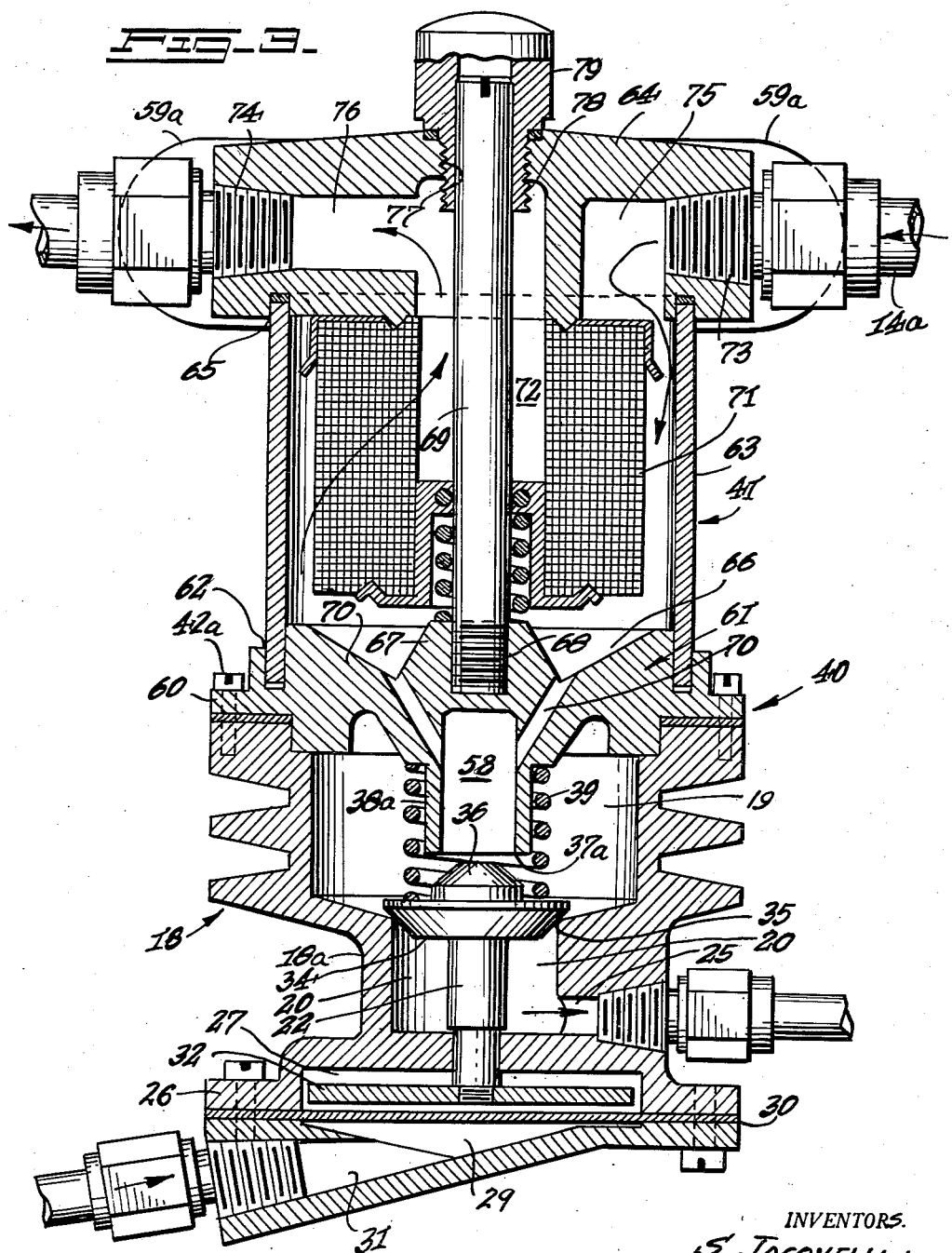

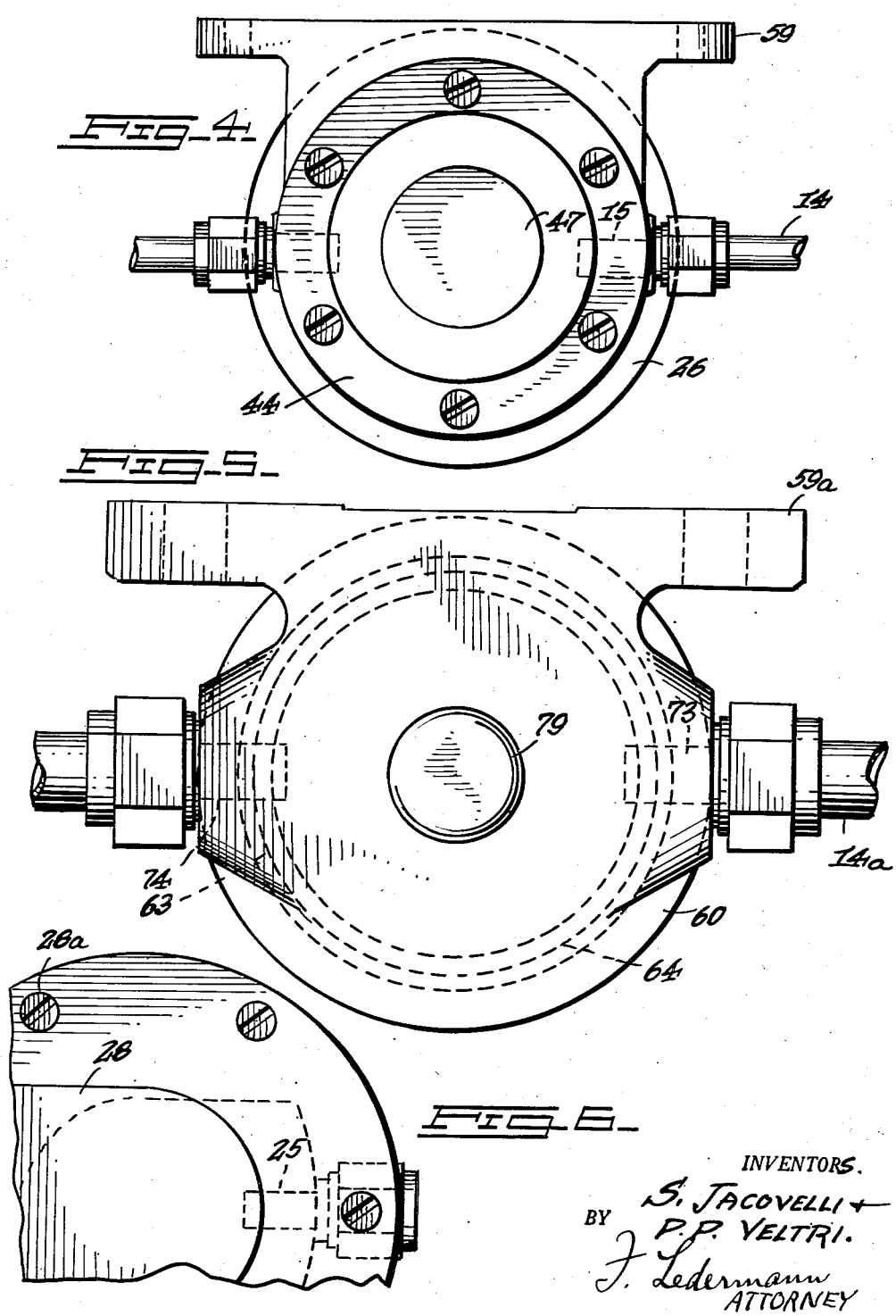

United States Patent Office 2,825,425
Patented Mar. 4, 1958

2,825,425

AUTOMATIC SLUDGE DRAINS FOR COMPRESSED AIR SYSTEMS

Samuel Jacovelli and Peter P. Veltri, Brooklyn, N. Y.

Application December 7, 1955, Serial No. 551,632

10 Claims. (Cl. 183—42)

This invention relates to sludge drains for compressed air systems, and one object thereof is the provision of a new and useful sludge drain for automatically, effectively, and repeatedly, during operation of the system, forcibly expelling sludge which has accumulated in the compressed air tank or reservoir, and the device may be positioned wherever desired at any level with respect to the tank. It is well known that sludge accumulates in the bottom of the tank, whence it is necessary to remove it to prevent its passing through the system into the machines or devices to be operated by the compressed air. Sludge drains at present known to the art are inefficient or defective in one way or another in that they do not accomplish the desired and necessary purpose of completely and promptly eliminating sludge from entry into the operating or delivery lines of the system.

Another object of the invention is the provision of a sludge drain contained within a housing adapted to be connected to an outlet in the bottom of the compressed air reservoir or tank, which will serve solely as a drain and which is repeatedly and automatically actuated to discharge the sludge trapped therein.

A further object of the invention is the provision of a sludge drain comprising a two-part housing, that is, a lower housing portion and an upper housing portion, with further provision of two separate upper housing portions either of which may be applied separately to the lower housing portion, whereby the sludge drain may be used either exclusively as a drain or in combination as a drain and filter for the compressed air. Both these forms of the device are applicable to industrial uses as well as in air brake systems for vehicles.

The above broad as well as additional and more specific objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details shown or described except insofar as they may be deemed essential to the invention.

Referring briefly to the drawing,

Fig. 1 is a side elevational view illustrating a compressed air reservoir or tank, with a sludge drain representing an embodiment of the present invention connected thereto.

Fig. 2 is an enlarged central longitudinal sectional view through the sludge drain of Fig. 1.

Fig. 3 is a view similar to Fig. 2, showing, however, the sludge drain converted into a combination sludge drain and air filter by replacement of the top housing portion of the former by a top housing portion including a filter.

Fig. 4 is a top plan view of Fig. 2.

Fig. 5 is a top plan view of Fig. 3.

Fig. 6 is a fragmentary bottom plan view of Fig. 2.

Referring in detail to the drawing, the numeral 10 indicates a compressed air tank or reservoir having an inlet 11 and an outlet 12, either or both of which are located anywhere desired on the tank. When, as illustrated in Fig. 1, the device is used solely as a sludge drain for the tank, the air outlet 12 will of course be connected with the apparatus to be operated by the compressed air.

The tank has a drain connection 13 leading through a pipe 14 to the inlet 15 in the upper portion 16 of the complete sludge drain housing 17, the lower portion thereof being indicated at 18.

As the lower housing portion is common to both forms illustrated in Figs. 2 and 3, it will be described first. The housing portion 18 is preferably cylindrical or shell-like in form, having a relatively large cylindrical chamber or compartment 19 above a reduced cylindrical passage 20 extending downward through a neck 18a leading from the funnel-shaped floor 21 of the shell 18. A valve 22 is slidably mounted in an opening 23 through the bottom wall 24 of the passage 20. A sludge outlet passage 25 is provided through the wall of the shell 18 to communicate with the passage 20, for discharge of sludge from the device. The housing 18 is widened at the bottom to provide a flange 26, and the latter is dished out on its underside to provide a widened shallow recess 27. A bottom cover 28, dished out on its top side provides a recess 29 complementary to the recess 27 and is locked against the rim of the flange 26, as by screws 28a, with a diaphragm 30 therebetween. Together, the complementary recesses 29 and 27 form a chamber 29, 27. An inlet 31 into the cover 28 and hence the chamber 29, 27, is adapted to be connected to any source of intermittent air pressure of the system, which, in the case of a vehicle, may be the brake operating line 31a.

A reinforcing or backing plate 32 is freely slidable vertically in the compartment 27; the lower end 33 of the valve 22 is reduced and threaded into a threaded axial hole in the plate. The valve 22 has a relatively wide inverted frusto-conical head 34 adapted to seat on the seat 35 formed by the rim of the passage 20 in the sloping floor 21. A coiled spring 39 rests on the head 34. Integral with and above the head 34 the valve 22 has a reduced frusto-conical projection or additional head 36 adapted to seat against the seat 37 on the open lower end of a downwardly extending tube or sleeve 38 of the upper housing portion 16. The spring 39 surrounds the sleeve 38.

It is to be noted that the lower portion 18 of the housing 40 of Fig. 3 is identical to the lower portion 18 of the housing 17 of Fig. 2, just described, the seat 37a in the sleeve 38a of the upper portion 41 of the housing 40 being equivalent to and similar to the seat 37 and sleeve 38, respectively, of Fig. 2.

When the device is to be used solely as a sludge drain, in the manner illustrated in Figs. 1 and 2, the upper housing portion 16 is secured to the lower housing portion 17, by means of screws or the like 42. The portion 16 comprises an annular section 43 and a cover portion 44, with a diaphragm 45 clamped therebetween, by the same screws 42, and together they enclose an upper compartment 46. A hollow boss 47 is provided in the cover, and a guide sleeve 48 extends downward from the roof of the boss, being spaced from the circumferential wall of the boss. A valve 49 comprises the body 50 and an axial stem 51 extending upward from the body into the guide sleeve 48, through the diaphragm 45. The lower end of this stem is threaded, and a reinforcing plate 52 is screwed thereon against the diaphragm; on top of the diaphragm a washer 53 is screwed. A coiled spring 54 registers between the sleeve 48 and the wall of the boss and rests on the plate 52 around the washer 53. The top 55 of the valve body 49 is enlarged and flat, thus providing a wide surface contact with the diaphragm 45. The lower end of the body 49 has an inverted frusto-conical extremity 56.

A funnel-shaped floor 57 for the compartment 46 is formed integral with the annular wall 43, having an axial opening 57a therein into the passage 58 through the depending tubular extension or sleeve 38, above referred to, the end 56 of the valve body 49 being adapted to seat on the peripheral portion of the wall 57 defining the opening 57a. Bracket arms 59 are provided on the annular portion 43 to permit of attaching the device to any suitable support.

The operation of the device used solely as a sludge drain (Fig. 2) is as follows. At all times during operation of the system air is applied in the compartment 46 at tank pressure through the inlet 15. Upon initial application of this pressure and after it attains a given amount, preferably substantially less than the normal tank pressure, the pressure in the compartment 46 will force the diaphragm 45 to expand upward and thus raise the plate 52, to unseat the valve end 56 against the force of the spring 54, thus enabling sludge entering with the air to drain from the compartment 46 down the sleeve 38 into the compartment 19. The valve 22 is normally in its lower extreme position, as shown, sealing the seat 35 but leaving the seat 37 of the sleeve 38 open, as the same air pressure pervades the compartments 46 and 19, and forces the valve 22 to its lowermost position. With the lower inlet 31 connected, as previously mentioned, to any source of intermittent air pressure such as, for example, the operating line of the brakes in the case of a vehicle, or of a pneumatic machine, every time the brakes or the machine are operated air under pressure will enter inlet 31 and, owing to the large area of the diaphragm 30 compared with the small cross-sectional area of the head 34 of valve 22, the latter will be quickly raised. Upon raising the valve 22 the lower head 34 will first open the passage 20 and the top head 36 will then seal the sleeve 38. When this occurs, sludge within the compartment 19 will not only drain out through outlet 25, but it will be forcibly expelled into the atmosphere by the pressure of the air therein. Then, upon cutting off of pressure under the diaphragm 30, the valve 22 will resume its lowermost position, owing both to pressure in the compartment 46 and the force of the spring 39. As the pressure under the diaphragm 30 does not drop to zero instantaneously but rather diminishes, taking, for example, a substantial fraction of a second, during this decay of pressure the valve 22 will alternately rise and fall between its extreme positions a number of times; for, upon being raised the first time in the manner mentioned, at the instant of falling to its lowermost position the diminished pressure under the diaphragm 31 will still be sufficient to raise the valve again, and almost instantly after reaching its uppermost position again it will again be forced down, and this movement is repeated until the pressure drops too low to be able to raise the valve. Thus, during each such repeated raising of the valve 22 an additional spurt of sludge will be discharged through the outlet 25.

Since the valve 22 moves almost but not quite instantaneously between its lower and upper extreme positions as indicated above, the escape of inlet air from the tank into the passage 20 and through the outlet 25 is limited to occur during very small intervals of time; that is, air may escape thus only during the time that the valve 22 is in motion between its extreme positions. As a consequence, the full operational pressure in the tank is so little diminished that it may be considered for practical purposes fully available at all times for operational purposes. Thus, sludge is continually drained from the tank so that no accumulation can occur therein to be carried into the machines or working parts operated by the compressed air.

When it is desired to filter the air before it enters the working parts to be actuated by the compressed air, the installation shown in Fig. 3 is made. As previously mentioned, the lower housing portion 18 of Fig. 2 is utilized unchanged for this purpose, and the upper housing portion 16 of Fig. 2 is removed by unscrewing the bolts 42. In its place, the filter housing portion 41 of Fig. 3 is attached by screws or the like 42a passed through a flange 60 at the bottom of the housing portion 41, i. e., the filter housing.

The flange 60 is part of the lower end or section 61 of the housing 41, the section 61 having a circumferential groove 62 in the top thereof in which the lower end of a tube 63 registers and is locked. A top section or cover 64 has a complementary circumferential groove 65 in the bottom thereof, in which the top edge of the tube 63 is locked. The top surface of the section 61 within the confines of the tube 63 has a circumferential groove 66 therein, V-shaped in cross-section, surrounding an axial flat-topped boss 67. A sleeve 38a, equivalent to the sleeve 38 of Fig. 2 and having a seat 37a similar to the seat 37 of Fig. 2, extends axially downward from the section 61. A threaded opening 68 extends into the boss 67 and the lower end of a stud 69 is threaded thereinto. Drain ports 70 extend downward from the base of the groove 66 into the passage through the sleeve 38a. The spring 39, which rests on the head 34 of the valve 22, surrounds the sleeve 38a. An annular filter assembly 71 of conventional type is mounted within the tube 63 about the stud 69 and is held in place between the boss 67 and the cover 64 by conventional means which prevent air entering the tube 63 from passing into the annular passage 72 enclosed by the filter except by passing through the filter. The cover is provided with diametrical inlet and outlet passages 73 and 74, respectively. The former communicates with a passage 75 open at the bottom into the space between the filter and of the tube, and the latter communicates with an annular passage 76 opening into the annular passage 72 of the filter. Thus, air entering the inlet 73 must pass through the filter to emerge from the outlet 74. Mounting bracket arms 59a are equivalent to those shown at 59 in Fig. 2.

The cover 64 has a threaded axial opening 77 in which an externally threaded sleeve extension 78 from a hollow plug or cap 79 is threaded to seal the said opening, and the upper end of the stud 69 registers in this opening. The stud 69, as is apparent in Fig. 3, serves to center the filter assembly.

When the filter unit of Fig. 3 is used, the inlet 73 is connected by a pipe 14a to the tank drain connection 13 of Fig. 1, and the tank will either have no other outlet such as that shown at 12 or if it has an outlet 12 the same will be closed.

In operation, when air from the tank passes through the filter housing 41, the sludge carried thereinto will be deposited in the enclosure of the tube 63, resting in the groove 66 and tending to descend through the ports 70 into the sleeve 38a. When pressure is applied, intermittently, through the inlet 31 under the diaphragm 30, exactly as previously described in reference to Fig. 2, the sludge will be expelled through the outlet 25 by being forced down under pressure through the ports 70 into the sleeve 38a, thence past the valve seat 35 into the compartment 20, during the period of time that the valve 22 is between its extreme upper and lower positions. The complete operation of expelling sludge through the outlet 25 of the device in Fig. 3 is in all respects the same as previously described in reference to the device of Fig. 2.

In further reference to the valve 49 and the associated parts of the device shown in Fig. 2, it is to be emphasized that this valve functions as a safety valve. The valve is initially set, by proper tension of the spring 54, to open when the inlet pressure from the tank reaches a given amount, and consequently to close when the inlet pressure drops below that amount. For example, if the tank pressure should normally be at 100 lbs. and the valve spring 54 is adjusted to permit the valve to open when the tank pressure falls to 60 lbs., then it is obvious that when the tank pressure falls to 60 lbs. the valve 49 will automatically close and shut off the flow of air into the sludge drain. This is a safety feature in that, should there be a leak anywhere in the system with a consequent drop in pressure in the tank, the sludge drain ceases operation when the tank pressure falls to the given level and hence stops utilizing any of the tank air to expel sludge. As a consequence, the dropping of pressure in the system owing to the leak is not augmented by the use of air by the sludge drain so that the full amount of the diminished pressure in the tank is available for operational purposes. In the case of a vehicle, for example a passenger bus, the diminished tank pressure, with the sludge drain thus cut out, should be sufficient to operate the brakes.

We claim:

1. In a compressed air system including a compressed air supply tank having an outlet, a sludge drain comprising a two-part sealed housing including a lower housing portion and an upper housing portion, said upper portion having an inlet adapted to be connected to said tank outlet and having a floor dividing the two-part housing into an upper compartment and a lower compartment, said floor having an axial passage therethrough into said lower compartment, said lower compartment having a floor having a reduced axial passage therethrough, said lower housing portion having a drain outlet into the atmosphere extending into said reduced axial passage, said reduced axial passage having a bottom wall provided with an axial opening, a valve having a depending stem extending upward through and slidably mounted in said bottom wall opening, said stem having a head thereon positioned between said first-named passage and said second-named passage adapted to close said second-named passage when the valve is in lowered position, said lower housing portion having a chamber under said bottom wall provided with an inlet thereinto adapted to receive intermittent applications of air under pressure, resilient means normally urging said valve into said lowered position, said valve stem extending downwardly into said chamber, and pressure-actuated means in said chamber for lifting said valve into said raised position thereof upon application of pressure by said pressure actuated means in said chamber.

2. The device set forth in claim 1, having an additional valve normally seated on the top of said first-named passage, a diaphragm in said upper compartment positioned between said first-named inlet and the ceiling of the upper compartment, means securing the diaphragm to said additional valve, and guide means restricting said additional valve to axial movement.

3. The device set forth in claim 1, said first-named passage and said second-named passage being positioned in axial alignment, said second-named passage having a diameter greater than the diameter of said first-named passage, said valve having an upper head portion adapted to seat against said first-named passage and having a lower head portion of larger diameter than said upper head portion adapted to seat on said second-named passage.

4. In a compressed air system including a compressed air supply tank having an outlet at the bottom thereof, a sludge drain comprising a two-part housing including a lower housing and an upper housing secured to the lower housing, said lower housing including an annular substantially vertical shell having a floor, said floor having an opening therethrough, said lower housing having a neck extending downward from said floor and having an axial passage therethrough communicating with said opening, said neck passage having a bottom wall provided with an opening therethrough aligned with said floor opening, said neck having a flange on the lower end thereof substantially at the level of said bottom wall, said flange having a recess in the underside thereof of greater diameter than said neck passage, a diaphragm mounted against the bottom circumferential wall of said flange and covering said recess, a bottom cover secured against the rim of the diaphragm, means locking the bottom cover to said flange with said diaphragm clamped therebetween, said bottom cover having a recess in the upper portion thereof adapted to be connected to an intermittently operated compressed air line of the system, said flange recess and said bottom cover recess together forming a chamber having said diaphragm between the top and bottom thereof, said chamber having an inlet thereinto adapted to be connected to said intermittently operated air line, a valve including a stem having a substantially smaller diameter than the diameter of said neck passage mounted in said neck passage and having its lower portion slidable in and extending downward through said bottom wall opening, said valve having a lower head on the upper end of the stem and having an additional upper head on top of said lower head, said lower head normally seating on the upper end of said neck passage and closing the same, said neck having a sludge outlet passage extending through the wall thereof into said first-named neck passage, said upper housing comprising a cylindrical hollow member including a cover closing the same at the top, the bottom circumferential edge of said member having substantially the same diameter as the top circumferential edge of said shell and being positioned coaxially on the shell with said circumferential edges in mutual engagement, means for locking said shell and said member together, said member having a floor at the bottom thereby providing a compartment between the floor and the top cover, a reduced sleeve extending axially downward from said last-named floor, said last-named floor having an opening therethrough into said sleeve, said upper valve head being normally positioned near but spaced below the lower end of said sleeve and being adapted upon being raised to seal said lower end of the sleeve, said member having an air inlet thereinto adapted to be connected to said tank outlet, the intermittent application of compressed air to said first-named inlet causing said diaphragm to expand upward to raise said valve stem to unseat said lower valve head and to seat said upper valve head against the lower end of said sleeve, the discontinuance of said application causing the tank pressure in said upper housing to restore said valve and hence said valve heads to said normal positions of said heads.

5. The device set forth in claim 4, said hollow member having an air inlet therein, and a filter interposed between said inlet and said outlet of said member.

6. The device set forth in claim 4, said top cover having a coaxial guide sleeve extending downward therefrom into said last-named compartment, a diaphragm mounted under said top cover and extending across said last-named compartment, a valve including a body and a stem extending upward through said last-named diaphragm and slidably registering in said guide sleeve, said valve body having a flat top in engagement with said last-named diaphragm, means locking said last-named diaphragm to said top of the valve body, resilient means normally urging said valve body and said last-named diaphragm downward, the lower end of said valve body in lowermost position thereof being adapted to seat on and seal said opening in the floor of the hollow member, the application of air from the tank in said inlet of said member causing said last-named diaphragm to rise to unseat said valve body from said opening in the floor of said member.

7. The device set forth in claim 1, having valve means associated with said first-named passage for opening the same upon the application of tank air pressure in said first-named inlet, and resilient means normally urging said valve means into closing position of said opening.

8. The device set forth in claim 6, said first-named valve stem having a reinforcing plate secured to the lower end thereof and positioned adjacent and above said first-named diaphragm, said plate being axially slidable in said chamber.

9. The device set forth in claim 6, said top cover having a substantially cylindrical hollow boss thereon, said guide sleeve extending downward from the top of the boss and being spaced from the circumferential wall of the boss, said resilient means comprising a coiled spring registering in the space between the guide sleeve and said circumferential wall and having its lower end engaging the top of said plate.

10. The device set forth in claim 6, said second-named valve stem having a reinforcing plate secured thereon above and in contact with said second-named diaphragm, said plate being axially slidable in said last-named compartment.

References Cited in the file of this patent
UNITED STATES PATENTS

| | | |
|---|---|---|
| 2,418,440 | White et al. | Apr. 1, 1947 |
| 2,585,045 | Schmidlin | Feb. 12, 1952 |
| 2,636,571 | Churchman | Apr. 28, 1953 |
| 2,669,320 | Shaw | Feb. 16, 1954 |